Feb. 26, 1957  A. L. STOECKEL ET AL  2,782,516
APPARATUS FOR MEASURING ELONGATED MAGNETIC PRODUCTS
Filed Oct. 23, 1953  3 Sheets-Sheet 1
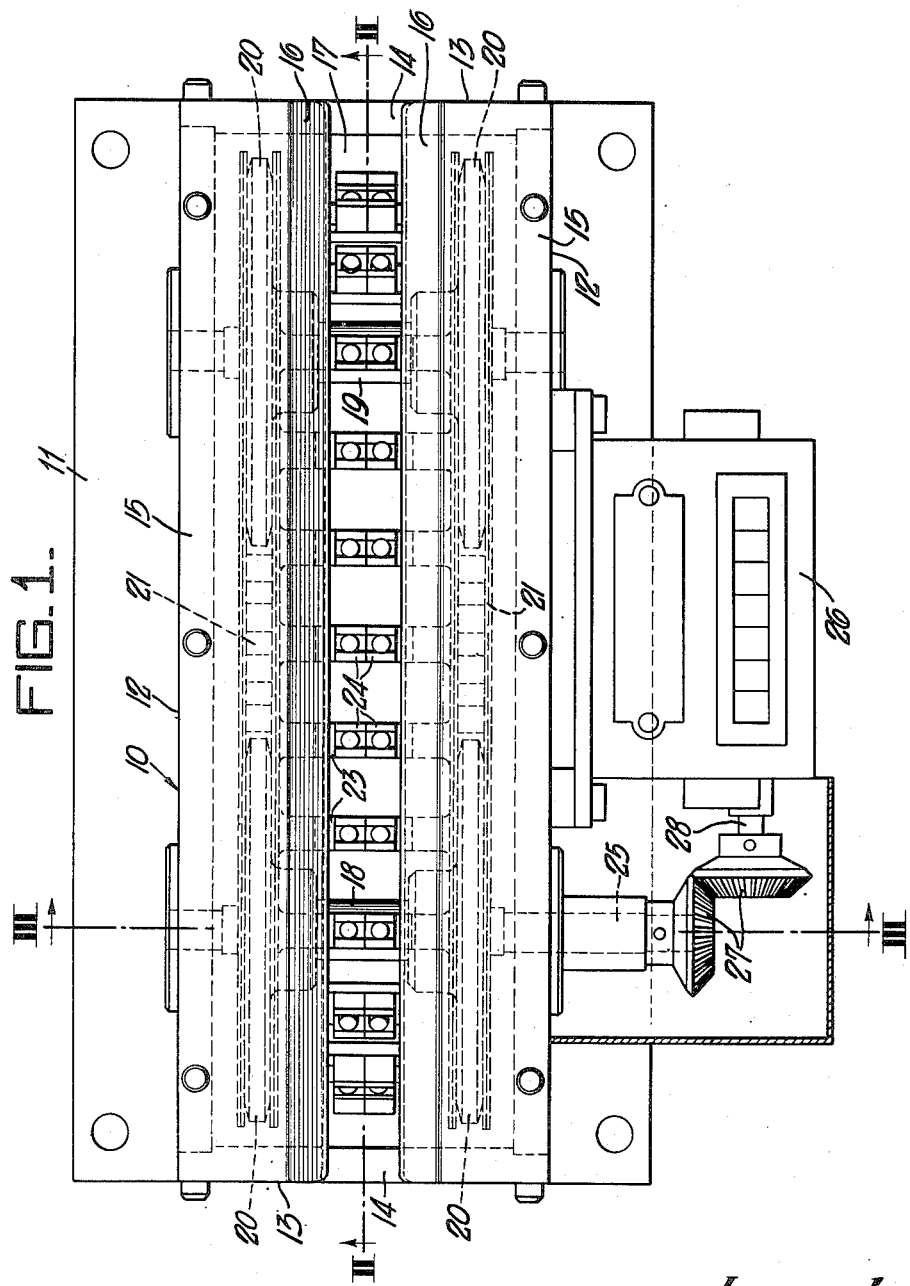
Inventors:
ALBERT L. STOECKEL and
CARL T. ZIMMERMANN,
by: Donald G. Dalton
their Attorney.

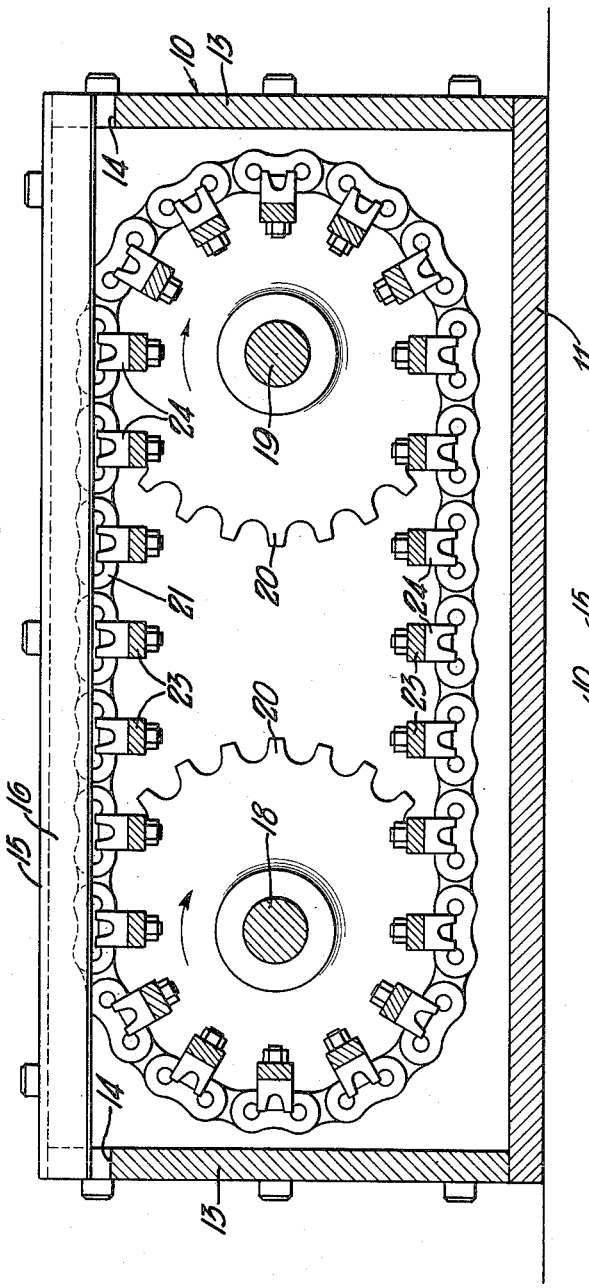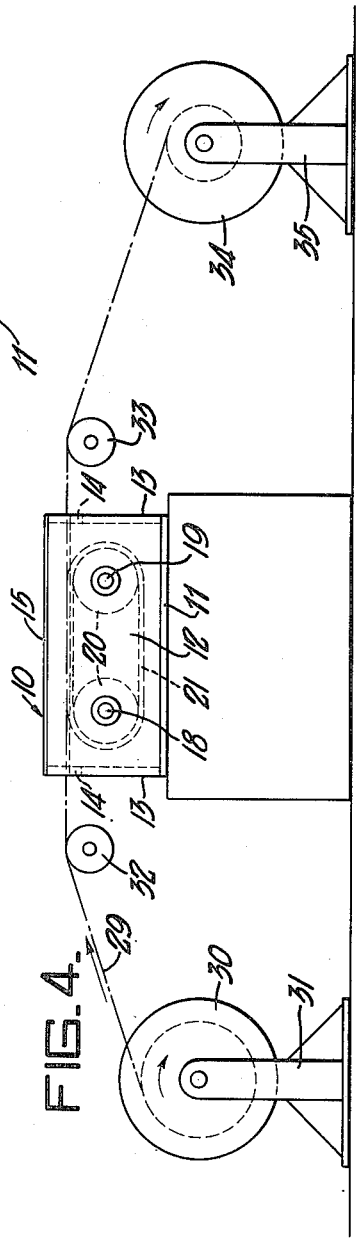

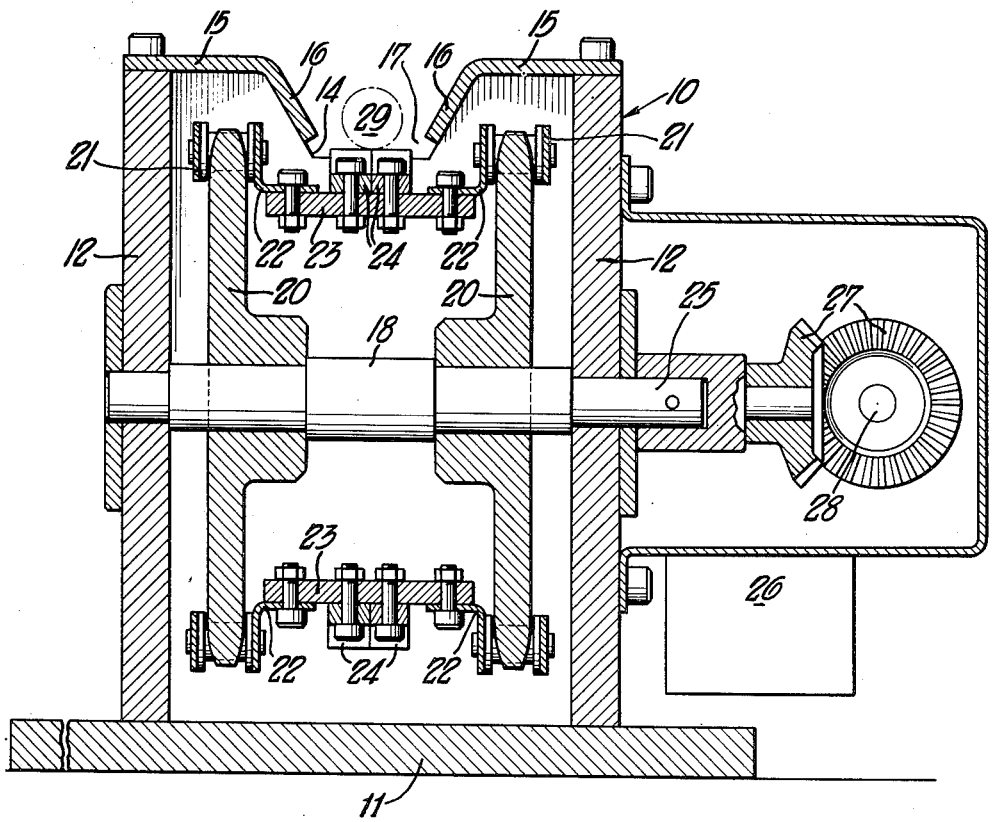

United States Patent Office 2,782,516
Patented Feb. 26, 1957

2,782,516

APPARATUS FOR MEASURING ELONGATED MAGNETIC PRODUCTS

Albert L. Stoeckel, Euclid, and Carl T. Zimmermann, Cleveland Heights, Ohio, assignors to United States Steel Corporation, a corporation of New Jersey Application October 23, 1953, Serial No. 388,033

6 Claims. (Cl. 33—129)

This invention relates to a device for measuring the length of elongated magnetic products such as steel wire, wire rope, twisted strand, strip or the like and, in particular, to a device embodying a series of magnets carried on an endless chain whereby the chain is driven by travel of the elongated product along a path close to the magnets.

Wheels driven by frictional contact have been employed heretofore for measuring the length of elongated products and serve the purpose satisfactorily for certain kinds of material. For other materials such as wire rope or twisted strand, the measurement is not sufficiently accurate because the character of the surface in contact with the wheel permits slippage. It has accordingly been proposed to employ a pair of opposed traveling elements such as belts engaging the material between them under pressure and thereby exerting sufficient frictional force to insure positive driving of the belts without slippage. This driving force, however, varies with the pressure and variations in the latter from time to time may result in inaccurate measurement. Opposed belts are objectionable, furthermore, because the material has to be threaded between them each time a new piece is started, or else the belts must be spread apart to permit the piece to be inserted sidewise therebetween.

We have invented an improved apparatus for accurately measuring elongated magnetic products, which overcomes the aforementioned objections and is characterized by further advantages over known measuring devices. In a preferred embodiment, we provide a frame or housing having a trough formed in the top thereof adapted to accommodate the material to be measured. The bottom of the trough is open. A continuous series of magnets carried by chains trained over spaced sprockets is free to travel along the bottom of the trough in such position as to engage elongated material lying therein. As the material is drawn through the trough, the attraction of the magnets therefor causes the chains to be driven frictionally. A shaft driven by one of the sprockets is connected to a counter or other means which registers the number of shaft revolutions and thereby affords an indication of the total length of product which has passed through the trough.

A complete understanding of the invention may be obtained from the following detailed description and explanation which refer to the accompanying drawings illustrating the present preferred embodiment. In the drawings, Figure 1 is a plan view;

Figure 2 is a view partly in elevation, with a part broken away and parts in section along the plane of line II—II of Figure 1;

Figure 3 is a transverse section along the plane of line III—III of Figure 1 with parts in elevation; and Figure 4 is a diagrammatic elevation showing the method of using the invention to perform a measuring operation.

Referring now in detail to the drawings, the device of our invention is enclosed in a box-like frame or housing 10 including a base 11, side walls 12 and end walls 13. The upper edge of each end wall is notched as at 14. Spaced deck plates 15 laid on the end walls have flanges 16 fitting against the sides of the notches and between them defining a trough 17 the bottom of which is open to the interior of the housing 10.

Shafts 18 and 19 are journaled transversely in the housing near opposite ends thereof. Each shaft has a pair of sprockets 20 secured thereto in spaced relation, one sprocket on each shaft being alined with one on the other. A roller chain 21 is trained around each pair of alined sprockets on the two shafts. Angle brackets 22 secured to the chains in spaced relation extend downwardly and inwardly therefrom, each bracket on one chain being alined with one on the other. A bridge plate 23 extends between and is secured to each pair of alined brackets on the two chains. A pair of permanent magnets 24 are secured side-by-side one on each side of the transverse central plane through each plate 23. The location of shafts 18 and 19 and the diameter of sprockets 20 are so correlated that the pole faces of the magnets carried by the upper runs of the chains are exposed through the open bottom of trough 17. The pole faces lie in the horizontal plane through the pitch lines of the chains. The pitch lines of the portions of the chains engaging the sprockets substantially coincide with the pitch circles of the latter so that for each unit length of travel of a magnet pole face, a point on the pitch circle of the sprockets travels an identical linear distance.

Shaft 18 has an extension 25 thereon. A counter 26 of known construction is mounted on one of the side walls 12 and is driven by shaft 18 through meshing bevel gears 27 one of which is secured to extension 25 and the other to the input shaft 28 of the counter.

It will be readily apparent that, if an elongated magnetic product 29 is laid in trough 17 and drawn longitudinally therethrough, the length of the product will be registered by the counter 26. The actual length may be obtained from the counter reading by a suitable conversion factor or the parts may be designed so that the shafts 18 and 19 turn through a complete revolution for every foot of travel of the chains. If the counter is such that it increases its registration one unit for each turn of shaft 28, this will make the counter read directly in feet.

Figure 4 shows a simple arrangement of apparatus whereby our device may conveniently be employed to measure the length of a product 29 such as wire rope, wound on a spool 30. The spool is placed on a supporting standard 31 on which it is free to turn. The outer end of the product coiled thereon is drawn over a guide sheave 32, laid in trough 17 of our device and drawn therethrough over a second guide sheave 33 to a second spool 34. Spool 34 is mounted for rotation on a standard 35 and is driven by hand or any suitable power means to rewind the product unwound from spool 30.

The magnets carried by chains 21, being exposed to the product at the bottom of trough 17, exert a strong frictional grip thereon and the chains are driven thereby to accurately indicate the length of the passing material by actuating the counter. As each pair of magnets arrives at the point where the product is tangent to the sprocket on the exit end of the device, the curved path in which the magnets thereafter travel causes their gradual and easy separation from the product.

Among the advantages of our improved device are increased accuracy of measurement, simplicity of construction, ease of operation and freedom from difficulty in upkeep. The attraction of the magnets for the product prevents slippage therebetween. In other words, magnets of sufficient strength to prevent slippage are available and the number and size of the magnets may be chosen to effect this objective. The use of permanent magnets assures a constant holding force and eliminates maintenance troubles. The pole faces of the magnets also afford a hard, wear-resistant surface for engaging the product. All that is necessary to start the measurement is to lay the product in the trough of the device and pull it therethrough.

Although we have dsiclosed herein the present preferred embodiment of our invention, we intend to cover as well any change or modification therein which may be made without departing from the spirit and scope of the invention.

We claim:

1. Apparatus for measuring the length of elongated magnetic products comprising a frame, means on top of said frame defining an open-bottomed trough running the length thereof adapted to receive said product as it travels lengthwise, spaced sprockets journaled in the frame, a chain trained around said sprockets, the upper run of the chain lying below the bottom of said trough, and magnets spaced along said chain extending into the bottom of the trough and adapted to attract into frictional engagement therewith the product traversing said trough.

2. The apparatus defined in claim 1 characterized by said means being spaced deck plates having opposed downwardly extending flanges inclined toward each other.

3. The apparatus defined by claim 1 characterized by there being two pairs of spaced sprockets, the sprockets of each pair being side-by-side on one of said shafts, two chains each trained around one sprocket of both pairs, and bridge plates extending between said chains, said magnets being carried on said plates.

4. Apparatus for measuring the length of elongated magnetic products comprising a frame, having a top deck provided with a longitudinal trough, flexible endless traveling means mounting a plurality of magnets and spaced guide means adjacent the trough over which said means travels whereby said magnets follow one another in a path along the bottom of the trough.

5. Apparatus for measuring the length of elongated magnetic products comprising a frame including a top deck provided with a longitudinal trough, and means conveying a plurality of magnets along the bottom of said trough in position to make tractive engagement with a product being drawn longitudinally through said trough.

6. Apparatus for measuring the length of elongated magnetic products comprising a frame, spaced parallel shafts journaled horizontally in said frame, alined sprockets on said shafts, respectively, an endless chain trained around said sprockets, magnets spaced along said chain, a deck on said frame above said sprockets having a trough therein normal to said shafts, the location of said shafts and the size of the sprockets being such that the magnets on the upper run of said chain travel along the bottom of said trough and are adapted to engage an elongated product drawn through said trough.

References Cited in the file of this patent
UNITED STATES PATENTS

| | | |
|---|---|---|
| 1,770,099 | D'Humy et al. | July 8, 1930 |
| 1,956,291 | Jessop | Apr. 24, 1934 |
| 2,081,102 | Blue | May 18, 1937 |
| 2,486,415 | Huntar | Nov. 1, 1949 |
| 2,578,733 | Nordquist et al. | Dec. 18, 1951 |